United States Patent
Yano et al.

(10) Patent No.: US 7,527,779 B2
(45) Date of Patent: May 5, 2009

(54) VAPOR GROWN CARBON FIBER, AND PRODUCTION METHOD AND USE THEREOF

(75) Inventors: Kotaro Yano, Kanagawa (JP); Masaharu Toki, Tokyo (JP); Hitoshi Inoue, Kanagawa (JP); Tomoaki Yoshida, Kanagawa (JP); Eiji Kanbara, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 514 days.

(21) Appl. No.: 10/534,407

(22) PCT Filed: Nov. 10, 2003

(86) PCT No.: PCT/JP03/14257

§ 371 (c)(1),
(2), (4) Date: May 11, 2005

(87) PCT Pub. No.: WO2004/044289

PCT Pub. Date: May 27, 2004

(65) Prior Publication Data

US 2006/0046051 A1 Mar. 2, 2006

Related U.S. Application Data

(60) Provisional application No. 60/426,400, filed on Nov. 15, 2002.

(30) Foreign Application Priority Data

Nov. 11, 2002 (JP) ............................... 2002-327192

(51) Int. Cl.
*D01F 9/12* (2006.01)
*B01J 21/18* (2006.01)
*B82B 1/00* (2006.01)

(52) U.S. Cl. .............. 423/447.1; 423/447.2; 423/447.3; 428/367; 428/401; 502/180; 977/754; 977/788; 977/832; 977/833

(58) Field of Classification Search .............. 423/447.3, 423/447.1, 447.2; 428/367, 401; 502/180; 977/754, 788, 832, 833
See application file for complete search history.

(56) References Cited

U.S. PATENT DOCUMENTS 4,572,813 A 2/1986 Arakawa (Continued)

FOREIGN PATENT DOCUMENTS

| JP | 7-150419 A | | 6/1995 |
|---|---|---|---|
| WO | WO 00/58536 | * | 10/2000 |
| WO | WO 02/49412 A | | 6/2002 |

OTHER PUBLICATIONS

Endo et al. Vapor-grown carbon fibers (VGCFs) Basic Properties and their battery applications. 2001. Carbon. vol. 39. p. 1287-1297.*
K. Lozano. Vapor-Grown Carbon-Fiber Composites: Processing and Electrostatic Dissipative Applications. 2000. JOM. p. 34-36.*
Patent Abstracts of Japan vol. 1995, No. 09, Oct. 31, 1995, abstracting JP 7-150419A of Jun. 13, 1995.

(Continued)

*Primary Examiner*—Timothy C Vanoy
*Assistant Examiner*—Serena L Hanor
(74) *Attorney, Agent, or Firm*—Sughrue Mion, PLLC

(57) ABSTRACT

A vapor grown carbon fiber, each fiber filament of the carbonfiber having a branching degree of at least 0.15 occurrences/μm and a bulk density of 0.025 g/cm$^3$ or less and a producing method of the carbon fiber by spraying a raw material solution containing a carbon source and a transition metallic compound into a reaction zone and subjecting the raw material solution to thermal decomposition, which is characterized in (1) spraying the raw material solution at a spray angle of 3° to 30° and (2) feeding a carrier gas through at least one site other than an inlet through which the raw material solution is sprayed, and a composite material comprising the carbon fiber.

6 Claims, 3 Drawing Sheets

U.S. PATENT DOCUMENTS

| | | | |
|---|---|---|---|
| 5,413,773 A * | 5/1995 | Tibbetts et al. | 423/447.3 |
| 5,413,866 A * | 5/1995 | Baker et al. | 423/447.2 |
| 5,594,060 A | 1/1997 | Alig et al. | |
| 5,643,990 A | 7/1997 | Uehara et al. | |
| 6,489,026 B1 * | 12/2002 | Nishimura et al. | 428/367 |
| 7,122,132 B2 * | 10/2006 | Morita et al. | 252/502 |
| 2002/0146562 A1 | 10/2002 | Morita et al. | |

OTHER PUBLICATIONS

P Hu et al, "Synthesis of tree-like carbon nanotubes with multijunction by a catalytic chemical vapor deposition method", Advanced Nanomaterials and Nanodevices (IUMRS-ICEM 2002, Xi an, China, Jun. 14, 2002 pp. 72-81, XP002271203.

* cited by examiner

VAPOR GROWN CARBON FIBER, AND PRODUCTION METHOD AND USE THEREOF

CROSS REFERENCE TO THE RELATED APPLICATIONS

This is an application based on the prescription of 35 U.S.C. Section 111(a) with claiming the benefit of filing date of U.S. Provisional Application Ser. No. 60/426,400 filed Nov. 15, 2002 under the provision of 35 U.S.C. 111(b), pursuant to 35 U.S.C. Section 119(e)(1).

TECHNICAL FIELD

The present invention relates to a method for producing carbon fiber through a vapor phase process. More particularly, the present invention relates to a method for producing carbon fiber having a large number of branches by thermally decomposing an organic compound through a vapor phase process, to carbon fiber produced through the method, and to a composite material containing the carbon fiber.

BACKGROUND ART

In general, carbon fiber is dispersed in a matrix such as resin, to thereby impart electrical conductivity and thermal conductivity thereto. Vapor grown carbon fiber (hereinafter may be abbreviated as "VGCF") is very useful, since, even when a small amount of the carbon fiber is added to a resin, the resultant resin composition exhibits greatly enhanced electrical conductivity and thermal conductivity, and therefore workability of the resin composition is not lowered, and the surface appearance of a molded product formed from the composition is not impaired (U.S. Pat. No. 5,643,990). As has been known, when carbon fiber having a large number of branches is added to a material, the electrical conductivity of the material is enhanced (WO 02/049412). Therefore, demand has arisen for production of carbon fiber having a large number of branches.

As one method for producing carbon fiber through a vapor phase process, a gasification method has been proposed (U.S. Pat. No. 4,572,813). In the gasification method, a solution of an organic substance in which an organo-transition metallic compound is dissolved is gasified, to thereby allow reaction to proceed at high temperature within a heating zone. This gasification method produces carbon fiber having a small number of branches. Meanwhile, there has been proposed a method for producing branched carbon fiber by spraying droplets of a raw material onto the wall of a reaction tube (Japanese Patent No. 2778434). In this method, droplets of a raw material are fed to the reaction tube wall, to thereby grow carbon fiber on the reaction tube wall. After the reaction tube wall is covered with the thus-grown carbon fiber, droplets of the raw material are sprayed onto the carbon fiber, a catalyst is generated on the carbon fiber, and, on the carbon fiber serving as a substrate, fresh carbon fiber is grown to thereby form branches, whereby branched carbon fiber is produced at high yield.

DISCLOSURE OF THE INVENTION

An object of the present invention is to provide carbon fiber having a considerably large number of branches as compared with conventional vapor grown carbon fiber through a producing method wherein the number of catalyst particles that are effectively utilized for carbon fiber growth is increased.

The present inventors have performed extensive studies on, for example, the method of feeding a raw material solution to a reaction zone of a vapor grown carbon fiber production apparatus (reaction tube), and as a result have found that carbon fiber having a large number of branches and a low bulk density is obtainable when the raw material is efficiently fed to a reaction zone maintained at a high temperature. The present invention has been accomplished on the basis of this finding.

Accordingly, the present invention provides a vapor grown carbon fiber, a method for producing the carbon fiber, and a composite material containing the carbon fiber, which are described below.

1. A vapor grown carbon fiber, each fiber filament of the carbon fiber having a branching degree of at least 0.15 occurrences/µm.
2. A vapor grown carbon fiber characterized by comprising carbon fiber filaments, each having a branching degree of at least 0.15 occurrences/µm, in an amount of at least 10 mass %.
3. A vapor grown carbon fiber having a bulk density of 0.025 g/cm$^3$ or less.
4. The vapor grown carbon fiber according to 1 or 2 above, which has a bulk density of 0.025 g/cm$^3$ or less.
5. The vapor grown carbon fiber according to any of 1 to 3 above, which, when compressed so as to have a bulk density of 0.8 g/cm$^3$, has a specific resistance of 0.025 Ωcm or less.
6. The vapor grown carbon fiber according to any of 1 to 3 above, each fiber filament of the carbon fiber having a diameter of 1 to 500 nm.
7. The vapor grown carbon fiber according to any of 1 to 3 above, which is produced by feeding a raw material solution containing a carbon source and a transition metallic compound into a reaction zone through spraying at a spray angle of 3° to 30° and subjecting the raw material solution to thermal decomposition.
8. The vapor grown carbon fiber according to any of 1 to 6 above, which is produced by feeding a raw material solution containing a carbon source and a transition metallic compound into a reaction zone through spraying, while feeding a carrier gas through at least one site other than an inlet through which the raw material solution is sprayed, and subjecting the raw material solution to thermal decomposition.
9. A method for producing a vapor grown carbon fiber comprising spraying a raw material solution containing a carbon source and a transition metallic compound into a reaction zone and subjecting the raw material solution to thermal decomposition, characterized in that the raw material solution is sprayed at a spray angle of 3° to 30°.
10. The method for producing a vapor grown carbon fiber according to 9 above, wherein droplets of the raw material solution have an average diameter of at least 5 l=.
11. The method for producing a vapor grown carbon fiber according to 9 or 10 above, wherein the raw material solution and a carrier gas are fed through a concentric multi-tube nozzle into a reaction tube.
12. The method for producing a vapor grown carbon fiber according to 11 above, wherein the raw material solution is fed through one of the tubes of the multi-tube nozzle, and another tube serves as a passage for the carrier gas only.
13. The method for producing a vapor grown carbon fiber according to 12 above, wherein the raw material solution and the carrier gas are fed through the inner tube of concentrically disposed two tubes, and the carrier gas is fed through the outer tube of the tubes.

14. The method for producing a vapor grown carbon fiber according to 12 above, wherein the carrier gas is fed through the innermost tube and the outermost tube of concentrically disposed three tubes, and the middle tube of the tubes serves as a passage for the raw material solution only.
15. A method for producing a vapor grown carbon fiber comprising spraying a raw material solution containing a carbon source and a transition metallic compound into a reaction zone and subjecting the raw material solution to thermal decomposition, characterized in that a carrier gas is fed through at least one site other than an inlet through which the raw material solution is sprayed.
16. The method for producing a vapor grown carbon fiber according to 15 above, wherein the raw material solution is sprayed at a spray angle of 3° to 30°.
17. The method for producing a vapor grown carbon fiber according to 9 or 15 above, wherein the raw material solution containing a carbon source and a transition metallic compound further contains a surfactant and/or thickening agent.
18. The method for producing a vapor grown carbon fiber according to 9 or 15 above, which comprises heating and firing recovered carbon fiber in a non-oxidative atmosphere at 800° C. to 1,500° C. and subsequently heating the thus-fired carbon fiber in a non-oxidative atmosphere at 2,000 to 3,000° C., to thereby graphitize the carbon fiber.
19. The method for producing a vapor grown carbon fiber according to 18 above, wherein, before being graphitized through heating, the recovered carbon fiber is doped with at least one boron compound, serving as a crystallization facilitating compound, selected from the group consisting of boron, boron oxide, boron carbide, a boric ester, boric acid or a salt thereof, and an organic boron compound in an amount of 0.1 to 5 mass % as reduced to boron.
20. A composite material comprising a vapor grown carbon fiber according to any of 1 to 8 above.
21. A composite material comprising a vapor grown carbon fiber produced through a method according to any of 9 to 19 above.
22. A resin composition comprising a vapor grown carbon fiber according to any of 1 to 8 above.
23. A resin composition comprising a vapor grown carbon fiber produced through a method according to any of 9 to 19 above.

Main raw materials (essential raw materials) employed for producing the carbon fiber of the present invention are an organic compound and a transition metallic compound.

No particular limitations are imposed on the organic compound which may be employed as a raw material of the carbon fiber, so long as the organic compound assumes to be in a liquid form. Specific examples of the organic compound which may be employed include aromatic compounds such as benzene, toluene and xylene; linear-chain hydrocarbons such as hexane and heptane; cyclic hydrocarbons such as cyclohexane; alcohols such as methanol and ethanol; gasoline; and kerosene. Aromatic compounds are preferred, with benzene being most preferred. These-carbon sources may be employed singly or in combination of two or more species. In the case of feeding of an organic compound, the entirety of the compound may be fed in the form of droplets. Alternatively, a portion of the organic compound may be fed in the form of droplets, and the remaining portion of the compound may be fed in the form of liquid or gas.

The transition metallic compound serving as a catalyst is preferably an organic or inorganic compound containing a metal belonging to Group IVa, Va, VIIa, VIIa or VIII. Particularly, Fe compounds, Ni compounds and Co compounds (e.g., ferrocene and nickelocene), which are transition metallic compounds that generate transition metal ultrafine seeds, are preferred.

Productivity of the carbon fiber can be enhanced by adding a sulfur source serving as a promoter to the raw material solution. The sulfur source may be elemental sulfur, an organic sulfur compound such as thiophene or an inorganic sulfur compound such as hydrogen sulfide. However, from the viewpoint of handling, elemental sulfur and thiophene, which are dissolved in a carbon source, are preferred. These sulfur sources (elemental sulfur and sulfur compounds) may be employed singly or in combination of two or more species.

The raw material solution is prepared by dissolving a transition metallic compound in an organic compound. Droplets of the raw material solution are preferably generated through the spraying method shown in FIG. 3, which employs a spray nozzle.

Preferably, the raw material droplets are heated as quickly as possible to the temperature of a reaction zone of a reactor, the temperature being determined to be equal to or higher than the decomposition temperature of the organic compound. This is because the decomposition temperature of the transition metallic compound is generally lower than that of the organic compound, and therefore, when the raw material droplets are heated slowly, the transition metallic compound decomposes to thereby generate fine particles of the metal before growth of carbon fiber, and the resultant fine particles collide with one another and are grown into large particles until they no longer exhibit a catalyst function. Quick feeding of the raw material droplets to the high-temperature zone by use of a spray nozzle is effective for generating large amounts of catalyst particles which can be employed for growth of carbon fiber. During the course of feeding of the droplets, a critical point is to regulate the spray angle of the raw material solution or the diameter of each of the droplets by varying, for example, the shape of the spray nozzle and the viscosity, surface tension and density of the raw material solution.

Specifically, the spray angle of the raw material solution is preferably 3° to 30°, more preferably 5° to 25°. As used herein, the term "spray angle" refers to, as shown in FIG. 1, an angle θ (vertical angle) formed by the outermost trajectories of the raw material droplets with the tip portion of a nozzle serving as the vertex. When the spray angle exceeds 30°, the droplets tend to collide against a reaction wall section whose temperature is low, the temperature increasing rate of the droplets which do not reach a high-temperature section becomes low, and the amount of effective catalyst particles decreases, whereby the resultant carbon fiber comes to have a small number of branches. In contrast, when the spray angle is less than 3°, the amount of the droplets which pass through the high-temperature section increases, and the conversion rate of the raw material is lowered, leading to low yield of the carbon fiber.

Each of the raw material droplets preferably has a diameter of 5 μm or more, more preferably 5 to 300 μm, much more preferably 10 to 100 μm. When the raw material droplet has a diameter of less than 5 μm, the gasification rate of the droplets increases and the droplets do not reach the high-temperature section. As a result, the temperature increasing rate of the droplets is lowered and the number of effective catalyst particles decreases, whereby the resultant carbon fiber comes to have a small number of branches. In contrast, when the raw material droplet has a diameter exceeding 300 μm, heating the raw material requires a long period of time, and thus the conversion rate of the raw material is lowered. As used herein, the droplet diameter is measured by means of the Doppler method as follows. Specifically, the raw material solution is sprayed outside a reaction tube by causing air to flow through a spray nozzle; the thus-sprayed droplet particles are irradiated with two crossed laser beams; light scattered by the particles that have passed through interference fringes is detected by a light-receiving device provided at a certain location; and the diameters of the particles are calculated on the basis of the phase difference. The average of the thus-calculated diameters of the particles is taken as the droplet diameter.

No particular limitations are imposed on the shape of the nozzle, so long as the droplet diameter and the spray angle fall within predetermined ranges. Preferably, the nozzle has a structure such that the droplet diameter and the spray angle can be readily regulated.

Specifically, there may be employed a nozzle having, for example, a concentric multi-tube structure, a single-fluid-type structure or a double-fluid-type structure (an interior mixing type in which a reactant solution and a carrier gas are mixed in the interior of a nozzle, or an exterior mixing type in which a reactant solution and a carrier gas are mixed outside a nozzle). Particularly, a nozzle having a concentric multi-tube structure or a double-fluid-type structure is preferred. When a double-fluid-type nozzle is employed, the droplet diameter can be regulated by varying the feed amount of the raw material solution or a carrier gas, and the spray angle can be regulated by varying the structure of the nozzle.

Specific examples of the nozzle of concentric multi-tube structure which may be employed include a nozzle of double-tube structure (its vertical cross-sectional view is shown in FIG. 2(A)) and a nozzle of triple-tube structure (its vertical cross-sectional view is shown in FIG. 2(B)). In order to regulate the spray angle of the raw material solution, preferably, at least a portion of a carrier gas (3) to be fed to a reaction tube (1) is fed through a tube other than a tube through which the raw material solution (4) is fed. In the case where a nozzle of double-tube structure is employed, when the raw material solution (4) and a carrier gas (hydrogen) (3) are fed through the inner tube (5), a portion of the carrier gas (3) is fed through the outer tube (6), and the spray angle can be readily regulated by increasing the amount of hydrogen (3) fed through the outer tube (6). At the spraying side (8) in a nozzle of double-tube structure, the inner tube may be longer or shorter than the outer tube. Employing the inner tube longer than the outer tube is preferable, as the spray angle is readily regulated. In the case of a nozzle of double-tube structure (2), the diameter of the inner tube is preferably 0.01 to 2 mm, more preferably 0.1 to 0.5 mm, and the clearance between the outer tube and the inner tube (d) is preferably 0.01 to 2 mm, more preferably 0.1 to 0.5 mm. When the diameter of the inner tube and the clearance between the outer tube and the inner tube exceed 2 mm, the raw material solution fails to be sprayed normally, and carbon fiber may fail to be generated as a result of growth of catalyst particles, whereas when the diameter of the inner tube and the clearance between the outer tube and the inner tube are less than 0.01 mm, the feed amounts of the raw material and the carrier gas fail to be increased, and thus productivity of carbon fiber is lowered.

In the case where a nozzle of triple-tube structure is employed, a carrier gas (3) is fed through the innermost tube (5) and the outermost tube (6), and the raw material solution is fed through the middle tube (7). In this case, when the rate of the carrier gas fed through the innermost and outermost tubes is regulated, the spray angle of the raw material solution can be readily regulated so as to fall within a range of 3° to 30°. At the spraying side (8) in a nozzle of triple-tube structure, the length of the innermost, middle and outermost tubes may be different. Employing the middle tube longer than the outermost tube is preferable, as the spray angle is readily regulated. As in the case of a nozzle of double-tube structure, the diameter of the innermost tube (5), the clearance between the outermost tube (6) and the middle tube (7), and the clearance between the middle tube and the innermost tube are preferably 0.01 to 2 mm, more preferably 0.1 to 0.5 mm.

Generally, the droplet diameter varies depending on the viscosity, surface tension and density of the solution to be sprayed. The droplet diameter can be regulated to a desirable size by adding a thickening agent, surfactant, etc. to the raw material solution.

Generally, the droplet diameter becomes larger when the viscosity of the raw material solution increases. Therefore, adding a thickening agent to the raw material solution enables to feed the raw material droplets to the high-temperature zone. There is no particular limitation on a thickening agent as long as it has a higher viscosity than that of the organic compound of the raw material and can be dissolved in the raw-material organic compound. Specifically, mineral oil, vegetable oil, vegetable fat, paraffin, fatty acids (oleic acid, linolic acid, etc.), fatty alcohol (decanol, octanol, etc.), polymer (polyvinylalcohol, polyethyleneglycol, polypropyleneglycol, etc.) are used.

As a surfactant, cation surfactant, anion surfactant, nonionic surfactant and ampholytic surfactant can be used. Desirable surfactants include $C_nH_{2n+1}SO_3M$ (n=8 to 16, M=Na, K, Li, $N(CH_3)_4$), $C_nH_{2n+1}SO_4M$ (n=8 to 16, M=Na, K, Li, $N(CH_3)_4$) $(C_nH_{2n+1})_2COOCH_2COOCHSO_3M$ (n=8 to 16, M=Na, K, Li, $N(CH_3)_4$) $C_nH_{2n+1}N(CH_3)_3X$ (n=8 to 15, X=Br, Cl, I), $C_nH_{2n+1}N(CH_3)_2CH_2COO$ (n=8 to 15), $C_nH_{2n+1}CHOHCH_2OH$ (n=8 to 15) and $C_nH_{2n+1}(OC_2H_4)_mHCH_2OH$ (n=8 to 15, m=3 to 8).

In order to feed the raw material and a transition metallic compound serving as a catalyst to a thermal decomposition zone for developing and maintaining the activity of the catalyst, a carrier gas containing at least a reducing gas such as hydrogen gas is employed. The amount of the carrier gas is appropriately 1 to 100 parts by mol on the basis of 1.0 part by mol of an organic compound serving as a carbon source.

No particular limitations are imposed on the location at which the carrier gas is brought into the reaction tube. As shown in FIG. 3, when hydrogen gas is fed through at least one inlet (preferably four inlets) other than the inlet through which the raw material solution is fed, the gas in the reaction tube develops turbulence and transfer of heat from the reaction tube wall is promoted, leading to an increase in yield of carbon fiber.

A vertical electric furnace is generally employed as a reaction furnace. The temperature of the reaction furnace is 800 to 1,300° C., preferably 1,000 to 1,300° C. The raw material solution and a carrier gas are fed to the reaction furnace heated to a predetermined temperature so as to allow reaction to proceed, thereby producing carbon fiber.

The thus-produced carbon fiber is preferably subjected to heat treatment for removal of volatile components and for graphitization of the carbon fiber. Removal of volatile components is carried out by recovering the carbon fiber containing branched carbon fiber filaments produced in the reaction furnace and then heating and firing the carbon fiber at 800° C. to 1,500° C. in a non-oxidative atmosphere such as argon gas. Subsequently, the thus-treated carbon fiber is further heated at 2,000 to 3,000° C. in a non-oxidative atmosphere to thereby allow graphitization to proceed. During the course of graphitization, the carbon fiber is doped with a small amount of a crystallization facilitating element to thereby enhance crystallinity of the fiber. The crystallization facilitating element is preferably boron. Since the surface of the thus-graphitized fine carbon fiber is covered with a dense basal plane (a plane of hexagonal network structure), preferably, carbon fiber of low crystallinity which has been heated at 1,500° C. or lower is doped with boron. Even when carbon fiber of low crystallinity is employed, carbon fiber of high crystallinity can be obtained since the carbon fiber is heated to its graphitization temperature when being doped with boron; i.e., when being subjected to boronization.

The doping amount of boron is generally 5 mass % or less on the basis of the entire amount of carbon. When carbon fiber is doped with boron in an amount of 0.1 to 5 mass %, the crystallinity of the carbon fiber can be effectively enhanced. Therefore, elemental boron or a boron compound (e.g., boron oxide ($B_2O_3$), boron carbide ($B_4C$), a boric ester, boric acid ($H_3BO_3$) or a salt thereof or an organic boron compound), which serves as a crystallization facilitating compound, is added to carbon fiber such that the boron content of the carbon fiber falls within the above range. In consideration of the conversion rate, the amount of the boron compound as reduced to boron is 0.1 to 5 mass % on the basis of the entire amount of carbon. It should be noted that the key requirement is that boron be present when the fiber is crystallized through heat treatment. Boron may be evaporated during the course of, for example, high-temperature treatment performed after carbon fiber has been highly crystallized, and thus the boron content of the carbon fiber may become lower than the amount of boron initially added to the fiber. Such a drop is acceptable so long as the amount of boron (B) remaining in the thus-treated carbon fiber is about 0.01 mass % or more.

The temperature required for introducing boron into carbon crystals or the surface of carbon fiber is 2,000° C. or higher, preferably 2,300° C. or higher. When the heating temperature is lower than 2,000° C., introduction of boron becomes difficult because of low reactivity between boron and carbon. Heat treatment is carried out in a non-oxidative atmosphere, preferably in an atmosphere of a rare gas such as argon. When heat treatment is carried out for an excessively long period of time, sintering of carbon fiber proceeds, resulting in low yield. Therefore, after the temperature of the center portion of carbon fiber reaches the target temperature, the carbon fiber is maintained at the target temperature within one hour.

The carbon fiber produced through the method of the present invention has a large number of branches and thus readily forms a strong fiber network. Therefore, even when a small amount of the carbon fiber is added to a matrix such as resin, the electrical conductivity and thermal conductivity of the matrix are enhanced. When the carbon fiber produced through the method of the present invention is compressed into a compact, the carbon fiber compact exhibits low specific resistance, since a strong fiber network is formed. The carbon fiber produced through the method of the present invention has a low bulk density, and filaments of the fiber are not strongly entangled with one another. Therefore, the carbon fiber is characterized in exhibiting a good dispersity when mixed in a material such as resin.

In the present invention, the diameter and branching degree of each fiber filament of the carbon fiber are obtained through observation of the filament under an electron microscope. The branching degree (b/ΣL) is calculated from the sum of the lengths (ΣL) of the carbon fiber filaments and the total branching points (b) of the filaments, both being measured within a field of view. That is, the branching degree is defined by the number of branching points per unit filament length. A characteristic feature of the carbon fiber of the present invention resides in that each fiber filament of the fiber has a branching degree of 0.15 occurrences/μm or more. Preferably, a branching degree is between 0.15 occurrences/μm and 10 occurrences/μm and more preferably between 0.15 occurrences/μm and 1 occurrences/μm. In the case where the branching degree is less than 0.15 occurrences/μm, when a small amount (about 1 mass %) of the carbon fiber is added to a material, the electrical conductivity of the material is barely enhanced. From the viewpoint of enhancement of electrical conductivity, preferably, the carbon fiber contains carbon fiber filaments having such a branching degree in an amount of 10 mass % or more.

The conventional gasification method produces carbon fiber containing substantially no branching portions, and conventional vapor grown carbon fiber (VGCF) has a branching degree of less than 0.15 occurrences/μm. When a small amount of such carbon fiber is added to a material, the electrical conductivity of the material is barely enhanced.

Another characteristic feature of the carbon fiber of the present invention resides in that the carbon fiber has a bulk density of 0.025 g/cm$^3$ or less. Preferably, the bulk density is between 0.01 g/cm$^3$ and 0.025 g/cm$^3$. In order to enhance reproducibility of measurement, the bulk density of the carbon fiber is obtained through the following procedure: the produced carbon fiber is heated in an argon atmosphere at 1,000° C. for 15 minutes and then vibrated by use of a vibration apparatus for one minute to thereby prepare a measurement sample; the sample (1 g) is placed into a 100-ml messcylinder and a microspatula is inserted thereinto, and the sample is stirred through vibration by use of a test tube Touch mixer for one minute; the resultant sample is stirred manually 10 times, and the microspatula is removed from the messcylinder, followed by vibration of the messcylinder by use of the Touch mixer for one minute; and the volume of the sample is measured and the bulk density is calculated from the mass and the volume of the sample.

Carbon fiber produced through the conventional gasification method has a bulk density of about 0.03 g/cm$^3$, and conventional vapor grown carbon fiber (VGCF) has a bulk density of about 0.04 g/cm$^3$. When a small amount of such carbon fiber is added to a material, the electrical conductivity of the material is barely enhanced.

Since the carbon fiber of the present invention is in a fibrous form, the carbon fiber is compressed into a compact having a bulk density of 0.8 g/cm$^3$, and the compact is subjected to measurement of specific resistance to determine the specific resistance of the carbon fiber. The specific resistance of the carbon fiber is preferably 0.025 Ωcm or less. In the case where the specific resistance is above 0.025 Ωcm, the electrical conductivity of the material is barely enhanced when a small amount (about 1 mass %) of the carbon fiber is added to a material.

No particular limitations are imposed on the diameter of each fiber filament of the carbon fiber, but the diameter is preferably 1-500 nm or thereabouts, more preferably 5 to 200 nm, from the viewpoint of enhancement of electrical conductivity.

The carbon fiber produced through the method of the present invention has a high branching degree, and thus exhibits excellent characteristics such as high electrical conductivity and high thermal conductivity. Therefore, when the carbon fiber is mixed with a matrix such as resin, metal or ceramic to thereby prepare a composite material, the matrix exhibits, for example, enhanced electrical conductivity and thermal conductivity.

Examples of the resin which may be employed in the composite material include thermoplastic resins and thermosetting resins. Specific examples include polyethylene (PE), polypropylene, nylon, urethane, polyacetal, polyphenylene sulfide, polystyrene, polycarbonate, polyphenylene ether, polyethylene terephthalate, polybutylene terephthalate, polyarylate, polysulfone, polyethersulfone, polyimide, polyoxybenzoyl, polyether ether ketone, polyetherimide, Teflon (registered trademark), silicon resin, cellulose acetate resin, ABS resin, AES resin, ABMS resin, AAS resin, phenol resin, urea resin, melamine resin, xylene resin, diallyl phthalate resin, epoxy resin, aniline resin and furan resin.

Examples of the ceramic matrix include aluminum oxide, mullite, silicon oxide, zirconium oxide, silicon carbide and silicon nitride.

Examples of the metal matrix include gold, silver, aluminum, iron, magnesium, lead, copper, tungsten, titanium, niobium, hafnium, alloys thereof and mixtures thereof.

BEST MODE FOR CARRYING OUT THE INVENTION

Figure 1:
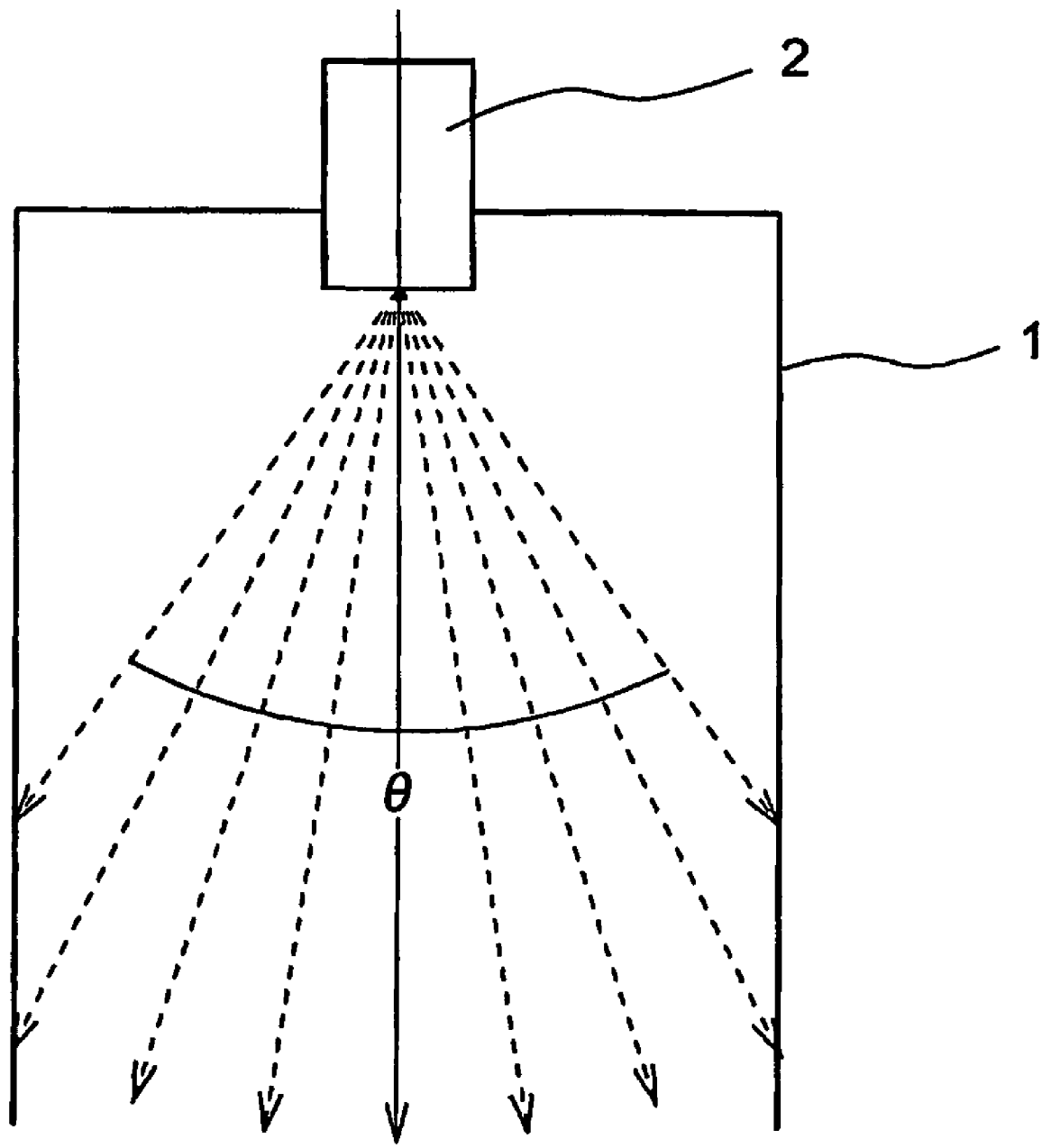
FIG. 1 is an explanatory view of the spray angle of a raw material solution.

The present invention will next be described with reference to Examples and Comparative Examples, but the present invention is not limited to the below-described Examples.

EXAMPLE 1

Ferrocene (0.83 kg) and sulfur (0.059 kg) were dissolved in benzene (14 kg) to thereby prepare a raw material solution (ferrocene content of the solution: 5.5 mass %, sulfur content of the solution: 0.39 mass %). Nitrogen gas was caused to flow through a reaction furnace system (1) shown in FIG. 3, which includes a vertical heating furnace (1) (inner diameter: 370 mm, length: 2,000 mm) whose top portion is equipped with a raw material feed nozzle (spray nozzle) (2) (SU11, product of Spraying Systems Co.), to thereby purge oxygen gas from the furnace system. Subsequently, hydrogen gas was caused to flow through the furnace system to thereby fill the furnace system with hydrogen gas. Thereafter, the temperature of the reaction furnace was raised to 1,250° C. By use of a pump, the raw material solution (130 g/min) and hydrogen gas (20 L/min) were fed through the raw material feed nozzle, and hydrogen gas (400 L/min) was fed through a flange (9) provided on the upper portion of the reaction furnace. The spray angle of the raw material solution and the average diameter of the sprayed droplets were 21° and 30 µm, respectively. Under the above conditions, reaction was allowed to proceed for one hour to thereby produce carbon fiber. The resultant carbon fiber was found to have a bulk density of 0.021 g/cm$^3$. The carbon fiber was found to have a specific resistance of 0.0236 Ωcm when being compressed so as to have a bulk density of 0.8 g/cm$^3$.

The thus-produced carbon fiber was observed under an electron microscope, and the average diameter of fiber filaments of the carbon fiber was found to be about 80 nm. The branching degree of each fiber filament was measured, and found to be 0.3 occurrences/µm. The mass of the carbon fiber was measured and carbonization yield (the mass of the produced carbon fiber/the mass of the fed benzene) was calculated to be 55%.

EXAMPLE 2

The vapor grown carbon fiber produced in Example 1 was fired at 1,000° C. for 15 minutes and then graphitized at 2,800° C. for 15 minutes. The thus-graphitized carbon fiber was dispersed in polyacetal by use of a kneader to thereby prepare a compound. The vapor grown carbon fiber was added to the resin in an amount of 5 mass %. The resultant compound was molded into a product by use of a thermal press and the volume resistivity of the molded product was measured by means of the four-terminal method. The volume resistivity was found to be 300 Ωm.

EXAMPLE 3

Figure 2:
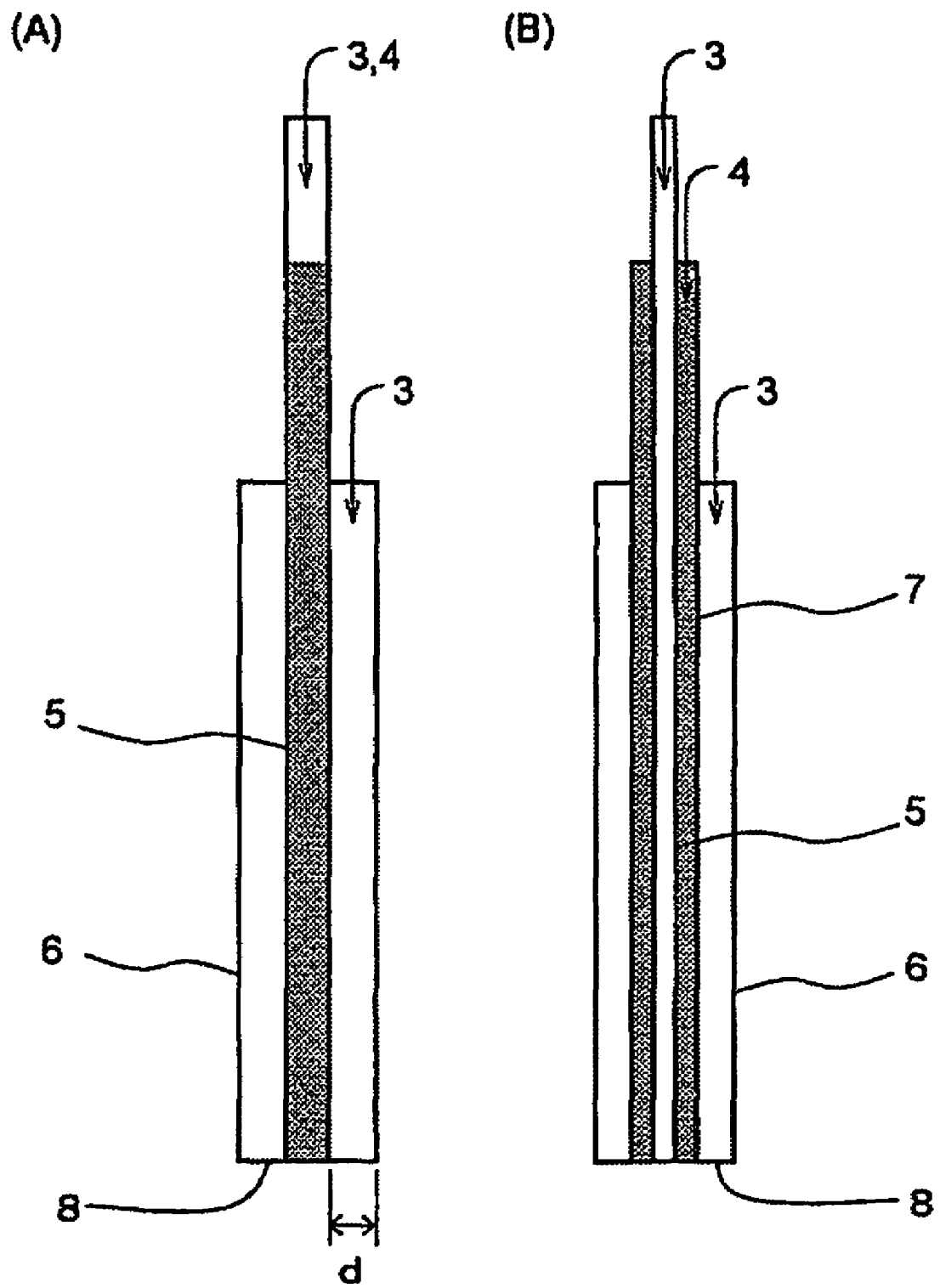
FIGS. 2(A) and 2(B) are vertical cross-sectional views showing the structures of a double-tube raw material feed nozzle and a triple-tube raw material feed nozzle, respectively, employed in the method of the present invention.
Figure 3:
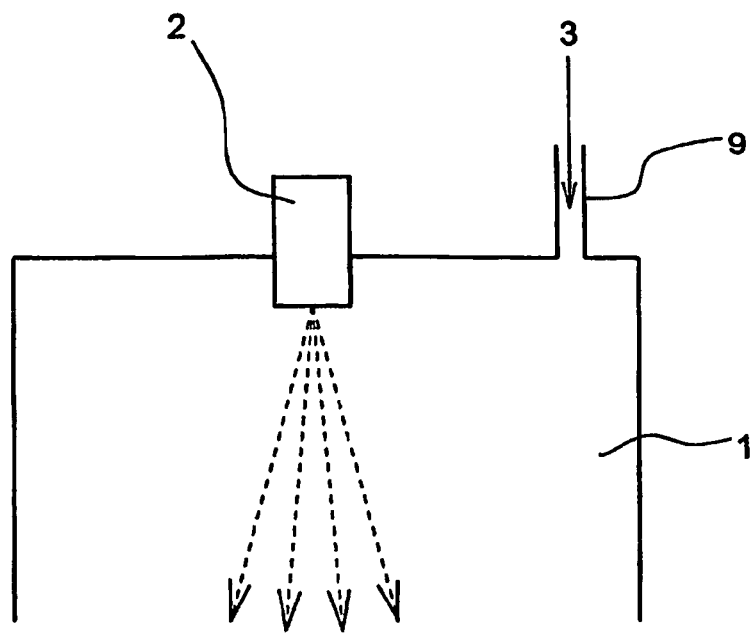
FIG. 3 shows an example of bringing a hydrogen carrier gas into a reaction tube through a site other than an inlet through which a raw material solution is sprayed.

Nitrogen gas was caused to flow through a reaction furnace system (1) shown in FIG. 3, which includes a vertical heating furnace (inner diameter: 370 mm, length: 2,000 mm) whose top portion is equipped with a double-tube raw material feed nozzle having a structure shown in FIG. 2(A), to thereby purge oxygen gas from the furnace system. Subsequently, hydrogen gas was caused to flow through the furnace system to thereby fill the furnace system with hydrogen gas. Thereafter, the temperature of the reaction furnace was raised to 1,250° C.

By use of a pump, a raw material solution (a benzene solution containing ferrocene in an amount of 4.5 mass % and sulfur in an amount of 0.32 mass %) (50 g/min) and hydrogen gas (5 L/min) were fed through the inner tube (5) of the raw material feed nozzle, hydrogen gas (10 L/min) was fed through the outer tube (6) of the nozzle, and hydrogen gas (200 L/min) was fed through a flange (9) provided on the upper portion of the reaction furnace. The spray angle of the raw material solution and the average diameter of the sprayed droplets were 26° and 30 µm, respectively. Under the above conditions, reaction was allowed to proceed for one hour to thereby produce carbon fiber. The resultant carbon fiber was found to have a bulk density of 0.022 g/cm$^3$. The carbon fiber was found to have a specific resistance of 0.027 Ωcm when being compressed so as to have a bulk density of 0.8 g/cm$^3$. The thus-produced carbon fiber was observed under an electron microscope, and the average diameter of fiber filaments of the carbon fiber was found to be about 100 nm. The branching degree of each fiber filament was measured and found to be 0.3 occurrences/µm. The mass of the carbon fiber was measured, and carbonization yield (the mass of the carbon fiber/the mass of the fed benzene) was calculated to be 60%.

EXAMPLE 4

Nitrogen gas was caused to flow through a reaction furnace system (1) shown in FIG. 3, which includes a vertical heating furnace (inner diameter: 130 mm, length: 2,000 mm) whose top portion is equipped with a double-tube raw material feed nozzle having a structure shown in FIG. 2(A), to thereby purge oxygen gas from the furnace system. Subsequently, hydrogen gas was caused to flow through the furnace system to thereby fill the furnace system with hydrogen gas. Thereafter, the temperature of the reaction furnace was raised to 1,250° C.

By use of a pump, a raw material solution (a benzene solution containing ferrocene in an amount of 7 mass % and sulfur in an amount of 0.5 mass %) (18 g/min) and hydrogen gas (5 L/min) were fed through the inner tube (5) of the raw material feed nozzle, hydrogen gas (10 L/min) was fed through the outer tube (6) of the nozzle, and hydrogen gas (450 L/min) was fed through a flange (9) provided on the upper portion of the reaction furnace. The spray angle of the raw material solution and the average diameter of the sprayed droplets were 26° and 20 μm, respectively. Under the above conditions, reaction was allowed to proceed for one hour to thereby produce carbon fiber. The resultant carbon fiber was found to have a bulk density of 0.049 g/cm$^3$. The carbon fiber was found to have a specific resistance of 0.042 Ωcm when being compressed so as to have a bulk density of 0.8 g/cm$^3$.

The thus-produced carbon fiber was observed under an electron microscope, and the average diameter of fiber filaments of the carbon fiber was found to be about 9 nm. The branching degree of each fiber filament was measured and found to be 0.2 occurrences/μm. The mass of the carbon fiber was measured and carbonization yield (the mass of the produced carbon fiber/the mass of the fed benzene) was calculated to be 15%.

EXAMPLE 5

Ferrocene (1 kg), sulfur (0.05 kg) and polypropyleneglycol (D-400, product of NOF Corporation, molecular weight: 400, decomposition temperature: 290° C.) (0.5 kg) were dissolved in benzene (13.5 kg) to thereby prepare a raw material solution (containing ferrocene, sulfur and polyporpyleneglycol in the amount of 7 mass %, 0.4 mass % and 3 mass % respectively). Nitrogen gas was caused to flow through a reaction furnace system (1) shown in FIG. 3, which includes a vertical heating furnace (1) (inner diameter: 370 mm, length: 2,000 mm) whose top portion is equipped with a raw material feed nozzle (spray nozzle) (2) (SU11, product of Spraying Systems Co.), to thereby purge oxygen gas from the furnace system. Subsequently, hydrogen gas was caused to flow through the furnace system to thereby fill the furnace system with hydrogen gas. Thereafter, the temperature of the reaction furnace was raised to 1,250° C.

By use of a pump, a raw material solution (230 g/min) and hydrogen gas (5 L/min) and hydrogen gas (20 L/min) were fed through the raw material feed nozzle, and hydrogen gas (400 L/min) was fed through a flange (9) provided on the upper portion of the reaction furnace. The spray angle of the raw material solution was 21° and the average diameter of the sprayed droplets was 40 μm. Under the above conditions, reaction was allowed to proceed for one hour to thereby produce carbon fiber. The resultant carbon fiber was found to have a bulk density of 0.024 g/cm$^3$. The carbon fiber was found to have a specific resistance of 0.024 Ωcm when being compressed so as to have a bulk density of 0.8 g/cm$^3$.

The thus-produced carbon fiber was observed under an electron microscope, and the average diameter of fiber filaments of the carbon fiber was found to be about 80 nm. The branching degree of each fiber filament was measured and found to be 0.4 occurrences/μm. The mass of the carbon fiber was measured and carbonization yield (the mass of the carbon fiber/the mass of the fed benzene) was calculated to be 57%.

COMPARATIVE EXAMPLE 1

Figure 4:
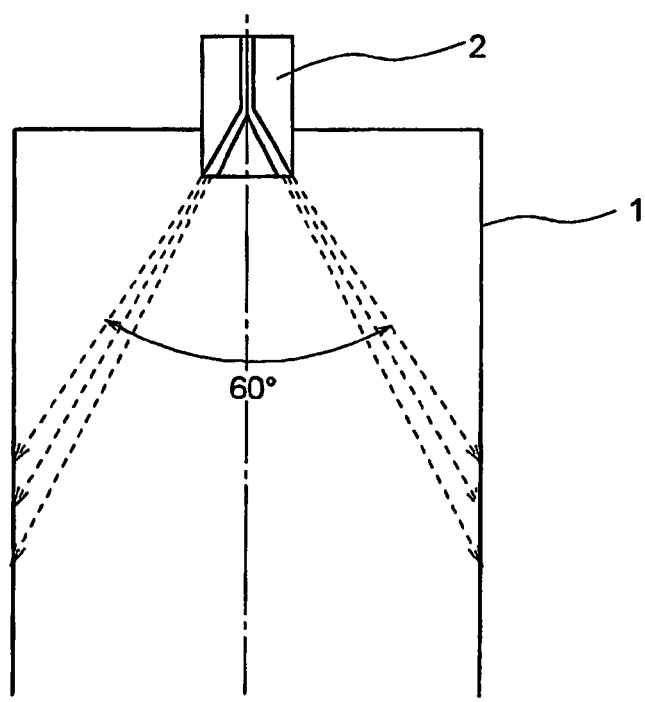
FIG. 4 is a schematic cross-sectional view showing a vapor grown carbon fiber production system employed in Comparative Example 1.

Carbon fiber was produced by use of a system shown in FIG. 4, which includes a vertical heating furnace (inner diameter: 370 mm, length: 2,000 mm) whose top portion is equipped with a double-fluid-type hollowcone raw material feed nozzle. Nitrogen gas was caused to flow through the furnace system to thereby purge oxygen gas from the furnace system. Subsequently, hydrogen gas was caused to flow through the furnace system to thereby fill the furnace system with hydrogen gas. Thereafter, the temperature of the reaction furnace was raised to 1,250° C.

By use of a pump, a raw material solution (a benzene solution containing ferrocene in an amount of 5.5 mass % and sulfur in an amount of 0.39 mass %) (130 g/min) and hydrogen gas (20 L/min) were fed through the raw material feed nozzle. The spray angle of the raw material solution was 60°. Under the above conditions, reaction was allowed to proceed for one hour to thereby produce carbon fiber. The resultant carbon fiber was found to have a bulk density of 0.04 g/cm$^3$. The carbon fiber was found to have a specific resistance of 0.03 Ωcm when being compressed so as to have a bulk density of 0.8 g/cm$^3$.

The thus-produced carbon fiber was observed under an electron microscope, and the average diameter of fiber filaments of the carbon fiber was found to be about 150 nm. The branching degree of each fiber filament was measured and found to be 0.13 occurrences/μm. The mass of the carbon fiber was measured, and carbonization yield (the mass of the produced carbon fiber/the mass of the fed benzene) was calculated to be 60%.

COMPARATIVE EXAMPLE 2

The vapor grown carbon fiber produced in Comparative Example 1 was fired at 1,000° C. for 15 minutes and then graphitized at 2,800° C. for 15 minutes. The thus-graphitized carbon fiber was dispersed in polyacetal by use of a kneader to thereby prepare a compound. The vapor grown carbon fiber was added to the resin in an amount of 5 mass %. The resultant compound was molded into a product by use of a thermal press, and the volume resistivity of the molded product was measured by means of the four-terminal method and found to be 100 Ωm.

The invention claimed is:

1. A vapor grown carbon fiber, each fiber filament of the carbon fiber having a branching degree of at least 0.15 occurrences/μm, and wherein the vapor grown carbon fiber has a bulk density of 0.025 g/cm$^3$ or less.

2. A vapor grown carbon fiber characterized by comprising carbon fiber filaments, each having a branching degree of at least 0.15 occurrences/μm, in an amount of at least 10 mass %, and wherein the vapor grown carbon fiber has a bulk density of 0.025 g/cm$^3$ or less.

3. The vapor grown carbon fiber according to any of claims 1 to 2, which, when compressed so as to have a bulk density of 0.8 g/cm$^3$, has a specific resistance of 0.025 Ωcm or less.

4. The vapor grown carbon fiber according to any of claims 1 to 2, each fiber filament of the carbon fiber having a diameter of 1 to 500 nm.

5. The vapor grown carbon fiber according to any of claims 1 to 2, which is produced by feeding a raw material solution containing a carbon source and a transition metallic compound into a reaction zone through spraying at a spray angle of 3° to 30° and subjecting the raw material solution to thermal decomposition.

6. The vapor grown carbon fiber according to any of claims 1 to 2, which is produced by feeding a raw material solution containing a carbon source and a transition metallic compound into a reaction zone through spraying, while feeding a carrier gas through at least one site other than an inlet through which the raw material solution is sprayed, and subjecting the raw material solution to thermal decomposition.

* * * * *